United States Patent
Alonichau et al.

(10) Patent No.: US 11,829,423 B2
(45) Date of Patent: Nov. 28, 2023

(54) DETERMINING THAT A RESOURCE IS SPAM BASED UPON A UNIFORM RESOURCE LOCATOR OF THE WEBPAGE

(71) Applicant: Microsoft Technology Licensing, LLC, Redmond, WA (US)

(72) Inventors: Siarhei Alonichau, Seattle, WA (US); Qiong Wei, Sammamish, WA (US); Aliaksei Bondarionok, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/359,474

(22) Filed: Jun. 25, 2021

(65) Prior Publication Data

US 2022/0414152 A1 Dec. 29, 2022

(51) Int. Cl.
*G06F 16/00* (2019.01)
*G06F 16/906* (2019.01)
*G06F 16/951* (2019.01)
*G06F 40/216* (2020.01)
*G06F 40/284* (2020.01)
*G06F 16/955* (2019.01)

(52) U.S. Cl.
CPC .......... *G06F 16/906* (2019.01); *G06F 16/951* (2019.01); *G06F 16/9566* (2019.01); *G06F 40/216* (2020.01); *G06F 40/284* (2020.01)

(58) Field of Classification Search
CPC .. G06F 16/9566; G06F 16/951; G06F 40/284; G06F 40/216; G06F 16/906
See application file for complete search history.

(56) References Cited

U.S. PATENT DOCUMENTS

| | | | |
|---|---|---|---|
| 7,509,344 B1* | 3/2009 | Kamvar | G06F 16/31 |
| 7,665,131 B2* | 2/2010 | Goodman | G06Q 10/107 |
| | | | 726/13 |
| 8,392,421 B1* | 3/2013 | Nucci | G06F 16/951 |
| | | | 707/739 |
| 9,621,566 B2* | 4/2017 | Gupta | H04L 63/1408 |
| 9,762,598 B1* | 9/2017 | Jagpal | H04L 63/062 |
| 11,294,974 B1* | 4/2022 | Shukla | G06F 16/90335 |
| 2004/0260922 A1* | 12/2004 | Goodman | G06Q 10/107 |
| | | | 713/154 |
| 2007/0078939 A1* | 4/2007 | Kallen | G06F 16/951 |
| | | | 709/207 |

(Continued)

*Primary Examiner* — Leslie Wong
(74) *Attorney, Agent, or Firm* — CALFEE, HALTER & GRISWOLD LLP

(57) ABSTRACT

Described herein are technologies relating to predicting whether a resource is spam based solely upon a Uniform Resource Locator (URL) for the resource. The URL is tokenized in connection with generating a sequence of numerical identifiers for the resource. A score for the URL is computed based upon the sequence of numerical identifiers, where the score is indicative of a probability that the resource pointed to by the URL is spam. generating a score for the URL based upon the sequence of numbers, wherein the score is indicative of a probability that the resource pointed to by the URL is spam. When the score is above a predefined threshold, a label is assigned to the URL that indicates that the resource pointed to by the URL is spam, and an entry for the resource is not included in a search engine index based upon the label assigned to the URL.

20 Claims, 7 Drawing Sheets

(56) References Cited

U.S. PATENT DOCUMENTS

| | | | | |
|---|---|---|---|---|
| 2009/0216760 | A1* | 8/2009 | Bennett | G06F 16/951 |
| | | | | 707/999.005 |
| 2010/0186088 | A1* | 7/2010 | Banerjee | G06F 21/56 |
| | | | | 709/224 |
| 2010/0223250 | A1* | 9/2010 | Guha | G06F 16/951 |
| | | | | 707/706 |
| 2010/0306249 | A1* | 12/2010 | Hill | G06F 16/9535 |
| | | | | 707/769 |
| 2011/0087648 | A1* | 4/2011 | Wang | H04L 63/1416 |
| | | | | 707/706 |
| 2012/0047122 | A1* | 2/2012 | Hauser | G06F 16/951 |
| | | | | 707/E17.115 |
| 2013/0298240 | A1* | 11/2013 | Gerber | H04L 63/1425 |
| | | | | 726/23 |
| 2017/0353434 | A1* | 12/2017 | Al-Saber | H04L 63/168 |
| 2018/0260565 | A1* | 9/2018 | Wang | H04L 63/1483 |
| 2018/0375896 | A1* | 12/2018 | Wang | G06F 16/9535 |
| 2020/0092326 | A1* | 3/2020 | Prakash | G06F 16/955 |
| 2020/0349430 | A1* | 11/2020 | Schmidtler | G06N 3/0445 |
| 2020/0374251 | A1* | 11/2020 | Warshaw | H04L 51/56 |
| 2021/0117544 | A1* | 4/2021 | Kurtz | G06F 21/566 |
| 2022/0046057 | A1* | 2/2022 | Kutt | H04L 63/1483 |

\* cited by examiner

HTTP://WWW.EXAMPLE.COM/PRDCTTYPE/NEWITM/PRODUCT.HTML

| TOKENS | TOKEN IDENTIFIERS | BIGRAMS | BIGRAM IDENTIFIERS |
|---|---|---|---|
| HTTP://WWW. | 5 | HTTP://WWW.EXAMPLE | 250623 |
| EXAMPLE | 25 | EXAMPLE.COM/ | 1345832 |
| .COM/ | 676 | .COM/PRDCT | 765231 |
| PRDCT | 2567 | PRDCTTYPE | 361232 |
| TYPE | 10876 | TYPE/ | 1635762 |
| / | 356 | /NEW | 678356 |
| NEW | 12567 | NEWITM | 888265 |
| ITM | 165789 | ITM/ | 1234567 |
| / | 356 | /PRODUCT | 299676 |
| PRODUCT | 25674 | PRODUCT.HTML | 566763 |
| .HTML | 213584 | .HTMLNULL | 986998 |

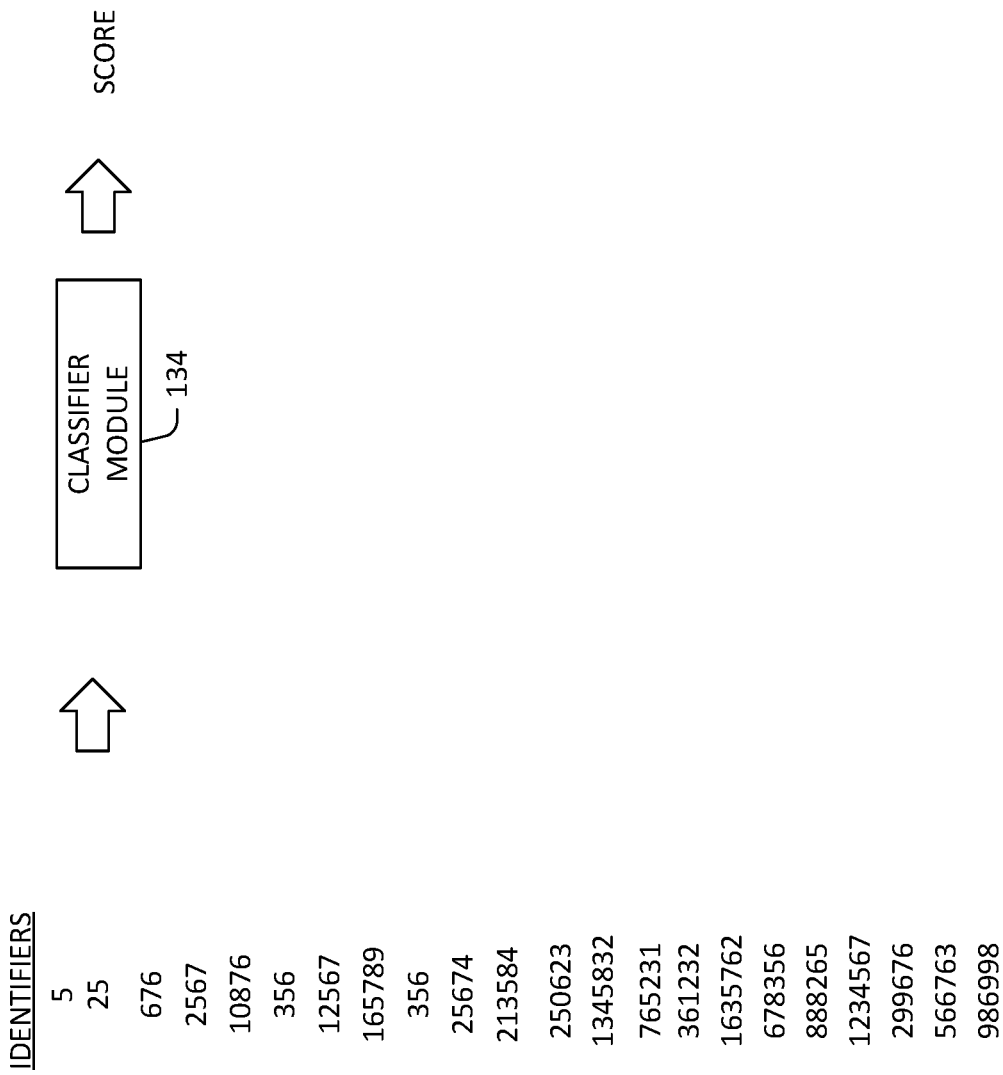

DETERMINING THAT A RESOURCE IS SPAM BASED UPON A UNIFORM RESOURCE LOCATOR OF THE WEBPAGE

BACKGROUND

A computer-implemented search engine is configured to receive a query from a client computing device and return search results that represent documents (e.g., webpages, images, videos, etc.) to the client computing device, where the documents corresponding to the search results have been identified by the search engine as being relevant to the query. With more specificity, when the search engine receives the query, the search engine searches over a computer-readable search engine index based upon the query, where the search engine index includes entries corresponding to webpages that have been previously crawled by a web crawler of the search engine. The search engine identifies webpages indexed in the search engine index based upon the query, and the search engine then ranks the identified webpages based upon several features of the webpages and/or the query, such as static scores assigned to the webpages, numbers of inbound and outbound links in the webpages, whether words in the query match words in the titles of the webpages, amongst numerous other features. The search engine then returns a search engine results page (SERP) to the client computing device, where, for example, the SERP includes ten search results that represent the ten webpages most highly ranked by the search engine.

A search engine index for a general-purpose search engine includes hundreds of millions to billions of entries that represent hundreds of millions to billions of webpages that are available on the World Wide Web. There are, however, several billion (or even several trillion) webpages that exist; therefore, it can be ascertained that a huge number of webpages are not represented in the search engine index, where a webpage is not represented in the search engine index either because: 1) the search engine is unaware of the existence of the webpage; or 2) the search engine has deemed the webpage as being unworthy of representation in the search engine index (e.g., the webpage includes content that is not relevant to users of the search engine, the webpage includes malicious content, etc.).

Conventionally, to determine that a webpage is spam (and thus should not be represented in a search engine index), a computer-executable module searches a URL that points to the webpage for a specific (known) pattern that corresponds to spam webpages and/or a sequence of characters that are included in a blacklist. When the URL includes the patterns or when the URL includes the sequence of characters that are in the blacklist, the URL is assigned a label that indicates that the webpage pointed to by the URL is spam. Otherwise, the webpage is retrieved and content is extracted from the webpage to ascertain whether the webpage is spam.

The above-described approach is suboptimal, as the creators of spam webpages often change tactics in an attempt to cause a search engine to index spam webpages and return them to users who issue queries. In an example, a spammer may ascertain that URLs with the word "spam" in the path of the URL are not indexed by search engines; accordingly, the spammer may make a minor change to the text in the path of the URL, so that the blacklisted word no longer appears. The webpage is then retrieved and examined, which consumes finite resources of the search engine. Thus, there is currently no robust approach detecting spam webpages without retrieving and analyzing content of the webpages.

SUMMARY

The following is a brief summary of subject matter that is described in greater detail herein. This summary is not intended to be limiting as to the scope of the claims.

Described herein are various technologies pertaining to determining that a resource that is available by way of the World Wide Web is spam without retrieving the resource and extracting content from the resource. With more particularity, the resource is determined to be spam based upon a Uniform Resource Locator (URL) for the resource, where a binary classifier receives a sequence of numerical identifiers (which represents at least a portion of the URL) and outputs a computed probability that the webpage is spam based upon the sequence of numerical identifiers. Therefore, unlike conventional approaches, the technologies described herein do not rely upon blacklists in connection with determining that a resource is spam, and further do not rely upon recognition of rigid patterns in URLs when determining that a resource is spam. Moreover, the technologies described herein can be used in combination with existing approaches for detecting spam resources; for instance, with respect to a resource, when a probability score output by the classifier indicates that the resource is not spam, the resource is retrieved and content from the resource is extracted and analyzed through use of natural language technologies (NLP). Therefore, computational resources are reserved while nevertheless resources that are spam are identified.

The classifier referenced above is trained based upon positive and negative training examples. The positive training examples are URLs that have been identified as pointing to resources that are spam, while the negative training examples are URLs that have been identified as pointing to resources that are not spam. The positive training examples are obtained based upon human labelers labeling resources as spam, computer-implemented tools labeling resources as spam based upon content extracted from the resources and analyzed by the computer-implemented tools, etc. The negative examples can be obtained from a search engine index of a search engine, where resources indexed in the search engine index are presumed to not be spam. The URLs are subjected to tokenization, such that each URL is represented by a series of identifiers (IDs), with each ID being a token in a vocabulary or representing an n-gram of predefined length. The number of tokens and length of n-grams are hyperparameters selected by a developer. Due to spammers often changing tactics, the computer-implemented classifier can be retrained periodically (e.g., every day, every other day) as new spam resources are identified and/or as new resources that are not spam are identified. Further, as will be described in greater detail herein, to avoid overfitting certain portions of some URLs can be masked (e.g., to prevent the classifier from providing an inordinate amount of weight to certain portions of URLs, such as hosts in URLs).

When a URL for a resource is received for analysis, the URL is tokenized and a sequence of identifiers for the URL is created, where the sequence of identifiers is representative of the URL. The sequence of identifiers is provided to the classifier, and based upon the sequence of identifiers the classifier outputs a score that is indicative of a probability that the resource pointed to by the URL is spam. The score can be compared to a threshold; when the score is above the threshold, a label is assigned to the URL, where the label indicates that the resource pointed to by the URL is spam.

Accordingly, the resource is not retrieved, and an entry for the resource is not included in a search engine index. Contrarily, when the score is below the threshold, the resource is retrieved and content of the resource is analyzed to ascertain whether or not the resource is spam.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is a schematic that depicts a binary classifier outputting a score for a URL based upon a sequence of identifiers that represents the URL.

DETAILED DESCRIPTION

Figure 1:
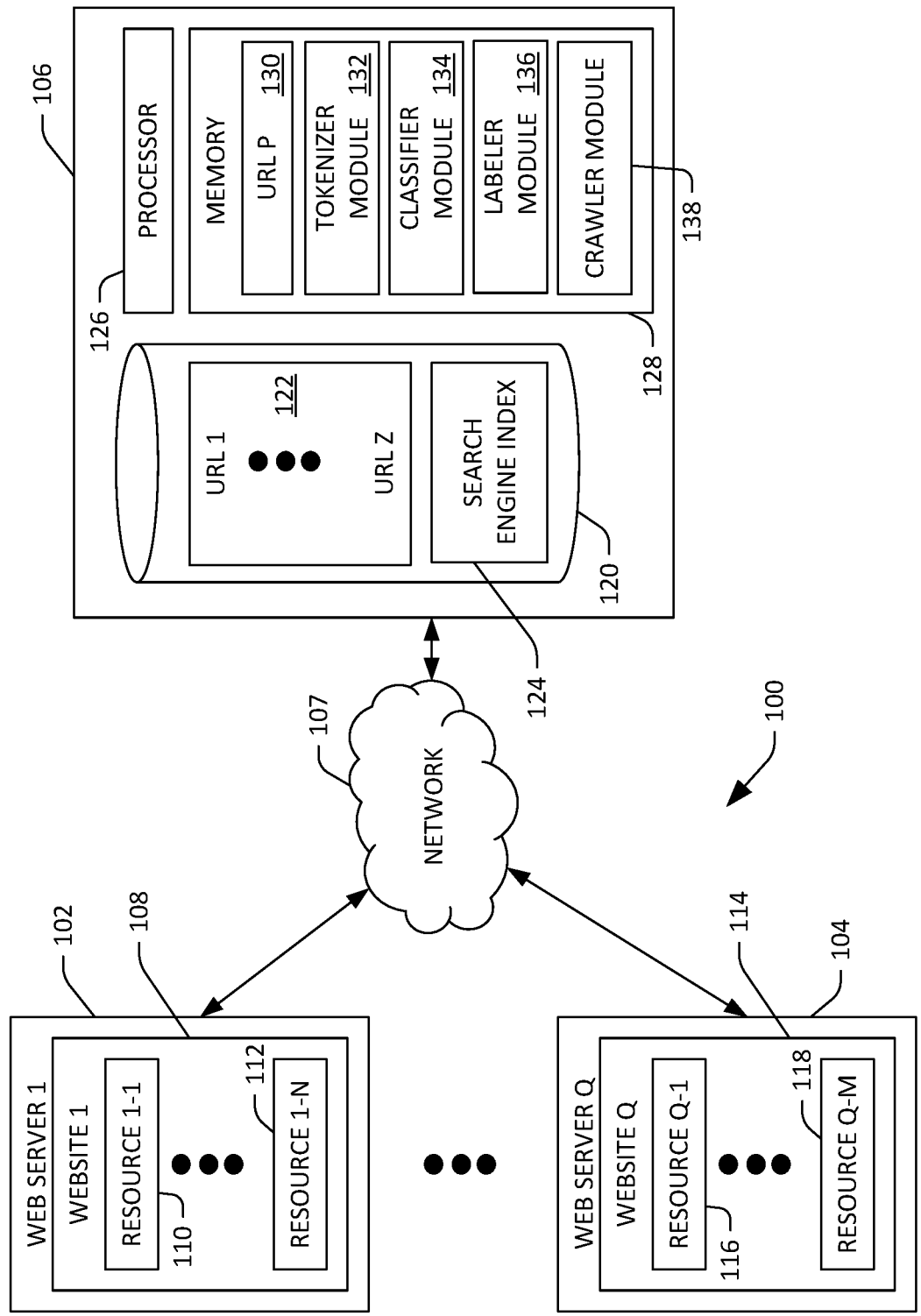
FIG. 1 is a functional block diagram of an example computing system that is configured to update a search engine index to include an entry for a resource pointed to by a Uniform Resource Locator (URL) based upon a score that is computed for the URL that is indicative of whether or not the resource is spam.

Various technologies pertaining to inferring that a resource available by way of the World Wide Web is spam based upon a Uniform Resource Locator (URL) of the resource are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Described herein are various technologies pertaining to inferring that a resource that is available by way of the World Wide Web (including but not limited to a webpage) is spam based solely upon a URL of the resource. As will be described in detail below, a computer-implemented binary classifier is configured to receive a sequence of identifiers that represents a URL and is trained to compute a score for the URL based upon the sequence of identifiers, where the score is indicative of a probability that the resource pointed to by the URL is spam. When the score is sufficiently high (e.g., above a threshold), a label is assigned to the URL indicating that the resource is spam; thus, an entry for the URL is not created in a search engine index. When the score is below the threshold, the resource is retrieved and subjected to automated analysis to ensure that the resource is not spam. There are numerous types of spam resources, including those that sell fake goods and services, those that include backlinks to spam webpages, those that include encrypted links, etc.

There are numerous advantages associated with the technologies described herein. These advantages include saving of compute resources compared to conventional technologies, as the search engine can save compute resources by determining not to crawl and/or index webpages based upon the webpages identified as being spam. The technologies also are associated with an improved search engine index, as a determination as to whether to include an entry for a webpage in the search engine index is made based upon the webpage identified as not being spam. Moreover, as the search engine index fails to include an entry for a spam webpage in a search engine index, computer-readable storage required to store the index is reduced, and search results may be returned more quickly as the search engine need not contemplate entries for spam webpages. Other advantages will be appreciated.

With reference now to FIG. 1, a functional block diagram of a system 100 is presented, where the system 100 is configured to update a search engine index to include an entry for a resource that is available by way of the World Wide Web based upon a determination that the resource is not spam, and further where the resource is inferred to not be spam based upon the URL for the resource. The resource may be a webpage, an image, a document, a video, etc. The example system 100 includes several web servers 102-104 and a computing system 106 that is in communication with the web servers 102-104 by way of a network 107. The web servers 102-104 host respective websites, where each of the websites hosted by the web servers 102-104 includes at least one resource. As illustrated in FIG. 1, the first web server 102 hosts a first website 108, where the first website 108 includes N resources 110-112. The Qth web server 104 hosts a Qth website 114, where the Qth website 114 includes M resources 116-118. While each of the web servers 102-104 is illustrated as hosting a single website, it is to be understood that one or more of the web servers 102-104 may host multiple websites. Additionally, while the websites 108 and 114 are illustrated as including several resources, one or more of the websites 108 and 114 may include a single resource. The resources 110-112 and 116-118 have URLs assigned thereto that point to locations where the resources 110-112 and 116-118 can be retrieved.

The computing system 106 is included in computing systems that implement a search engine. To that end, the computing system 106 includes a computer-readable data store 120 that retains a list of URLs 122, where each URL in the list of URLs 122 points to a resource that is retrievable by way of the Internet. The data store further includes a search engine index 124, where the search engine index 124 includes entries for respective resources that have been crawled by a crawler of the search engine. In an example, the URLs in the list of URLs 122 correspond to resources that the search engine is aware of but for which there are no entries in the search engine index 124, and further where the resources corresponding to the URLs in the list of URLs 122 have not been analyzed to determine whether such resources are spam. The websites 108 and 114 may be relatively new websites, where sitemaps for the websites 108 and 114 have been submitted to the computing system 106 but the search engine has yet to crawl the resources 110-112 and 116-118 of the websites 108 and 114, respectively. The sitemaps include URLs of the resources 110-112 and 116-118, and therefore the listing of URLs 122 includes the URLs of the resources 110-112 and 116-118.

The technologies described herein relate to determining whether or not the resources 110-112 and 116-118 can be characterized as being spam based upon their respective URLs, without requiring retrieval of the resources 110-112 and 116-118 from the web servers 102-104 to analyze content of the resources 110-112 and 116-118. As will be described in greater detail below, a determination as to whether or not a resource is spam can be made based upon tokenization of a URL that points to the resource.

The computing system 106 includes a processor 126 and memory 128 that includes data that is retrieved by the processor 126 and instructions that are executed by the processor 126. The memory 128 has a Pth URL 130 loaded therein, where the Pth URL 130 was retrieved from the list of URLs 122 in the data store 120. In an example, the Pth URL 130 is the URL of the first resource 110 of the first website 108 hosted by the first web server 102. The memory 128 further includes a tokenizer module 132 that is configured to tokenize URLs, such that the tokenizer module 132 breaks a received URL into a sequence of tokens. The tokenizer module 132 is additionally configured to generate a sequence of identifiers based upon the sequence of tokens, where an identifier in the sequence of identifiers represents an n-gram in the received URL. The received URL is thus represented by a sequence of tokens and a sequence of (non-overlapping) identifiers, collectively referred to herein as a sequence of IDs.

The memory 128 also includes a classifier module 134 that is configured to receive sequences of IDs output by the tokenizer module 132 and compute scores based upon the sequences of IDs, where a score computed by the classifier module 134 is indicative of a likelihood that a resource pointed to by a URL represented by the sequence of IDs is spam. The memory 128 also includes a labeler module 136 that is configured to assign a label to a URL based upon a score computed for the URL by the classifier module 134. The label indicates one of: a) that the resource pointed to by the URL is spam; or b) the resource should be retrieved for potential representation in the search engine index 124. Finally, the memory 128 includes a crawler module 138 that is configured to crawl a webpage when a score output by the classifier module 134 for a URL of the resource is below a threshold.

Operation of the tokenizer module 132, the classifier module 134, the labeler module 136, and the crawler module 138 is now described with respect to the Pth URL 130. The tokenizer module 132 receives the Pth URL 130, parses the Pth URL 130, and breaks the Pth URL 130 into a sequence of tokens. In an example, the tokenizer module 132 is trained to identify some predefined number of different tokens (e.g., 250,000 potential tokens), and parses the Pth URL 130 in search of such tokens. Upon tokenizing the Pth URL, the tokenizer module 132 maps the tokens to predefined (numerical) token identifiers. Thus, the tokenizer module 132 transforms the sequence of tokens extracted from the Pth URL 130 into a sequence of token identifiers. Optionally, the tokenizer module 132 forms a sequence of n-grams (e.g., bigrams, trigrams, four-grams, etc.) and maps each n-gram into one of a predefined number of n-gram identifiers. In a specific example, the tokenizer module 132 forms a sequence of bigrams from the sequence of tokens and hashes each bigram into one of several million (e.g., 10 million to 200 million) bigram identifiers. In another example, the tokenizer module 132 forms a sequence of trigrams from the sequences of tokens and hashes each trigram into one of several million trigram identifiers (e.g., 10 million to 200 million). Therefore, the tokenizer module 132 transforms the Pth URL 130 into a sequence of IDs, where the IDs include a sequence of token identifiers and a sequence of n-gram identifiers.

The classifier module 134 receives the sequence of IDs for the Pth URL output by the tokenizer module 132 and computes a score based upon the sequence of IDs, where the score is indicative of a likelihood that the resource pointed to by the URL is spam. Put differently, the classifier module 134, upon receipt of the output of the tokenizer module 132, ascertains whether the sequence of IDs of the Pth URL 130 are closer to: 1) sequences of IDs that represent URLs whose resources have previously been identified as being spam; or 2) sequences of IDs that represents URLs whose resources have previously been identified as not being spam.

As will be described in greater detail below, the classifier module 134 is trained based upon several positive and negative training items, where positive training items include URLs of resources that have been previously identified as being spam (e.g., by human labelers and/or a computer-implemented tool that labels resources as being spam based upon content of the resources extracted therefrom by the computer-implemented tool) and negative training items include URLs of resources that have entries in the search engine index 124 (and presumably therefore are not spam). When the classifier module 134 is trained, the tokenizer module 132 receives URLs in the positive and negative training items and outputs sequences of IDs that represent the URLs. The classifier module 134 is trained based upon such sequences of IDs.

The classifier module 134 outputs the score, and the labeler module 136 assigns a label to the Pth URL 130 based upon the score output by the classifier module 134. For example, the labeler module compares the score output by the classifier module 134 with a predefined threshold; when the score is above the threshold (and thus the classifier module 134 has indicated that there is a high probability that the Pth resource pointed to by the Pth URL 130 is spam), the labeler module 136 assigns a label to the Pth URL 130 that indicates that the Pth resource is spam. Due to such label, the crawler module 138 does not retrieve the Pth resource, thereby conserving computing resources of the computing system 106. When the score is below the threshold (and thus the classifier module 134 has indicated that there is at least some likelihood that the Pth resource is not spam), the labeler module 136 assigns a label to the Pth URL 130 indicating that the Pth resource should be crawled by the crawler module 138. The Pth URL 130 can thus be added to a list of URLs, where the crawler module 138 is to crawl resources pointed to by URLs in such list.

While not illustrated, the computing system 106 can optionally include a computer-implemented tool that analyzes content extracted from resources and ascertains whether the resources are spam based upon the content extracted therefrom. For instance, such a tool uses natural language processing (NLP) technologies to ascertain whether or not a resource is spam—therefore, even when the classifier module 134 outputs a score that indicates that there is a reasonably high likelihood that the Pth resource is not spam based upon the Pth URL 130, the computer-implemented tool analyzes content extracted from the Pth resource by the crawler module 138 and may determine that, in fact, the Pth resource is spam. The computer-implemented tool can then add the Pth URL to a list of URLs that point to spam resources. When the Pth resource is identified as not being spam by the computer-implemented tool, the search engine index 124 can be updated to include an entry for the Pth resource.

Subsequent to the search engine index 124 being updated to include the entry for the Pth resource, the search engine can receive a query from a client computing device operated by a user, and the search engine can return search results based upon the updated index 124 (e.g., the search engine returns a search result that represents the Pth resource).

While the classifier module 134 has been described as being configured to compute a score that is indicative of a likelihood that the Pth resource (pointed to by the Pth URL 130) is spam, it is to be understood that the classifier module 134 can be adapted to output scores for the Pth resource that are indicative of other likelihoods. In another embodiment, based upon the sequence of identifiers for the Pth URL 130 output by the tokenizer module 132, the classifier module 134 is configured to output a score that is indicative of a likelihood that the Pth resource will cause a client computing device that loads the Pth resource to install malware thereon. In such an embodiment, the classifier module 134 is trained based upon positive and negative training items, where the positive training items include URLs of resources that have previously been identified as causing malware to be installed on client computing devices and negative training items include URLs of resources that have previously been identified as not causing client computing devices to install malware thereon. In yet another embodiment, based upon the sequence of identifiers for the Pth URL 130 output by the tokenizer module 132, the classifier module 134 is configured to output a score that is indicative of a likelihood that the Pth resource includes pornographic material. In such an embodiment, the classifier module 134 is trained based upon training items that include URLs of webpages and indications as to whether or not the webpages include pornographic material.

In still yet another embodiment, based upon the sequence of identifiers for the Pth URL 130 output by the tokenizer module 132, the classifier module 134 is configured to output a score that is indicative of a likelihood that the Pth resource includes material that is generally not suitable for viewing by children under a particular age (e.g., a likelihood that the Pth resource is not family friendly). In such an embodiment, the classifier module 134 is trained based upon training items that include URLs of resources that have been identified as being family friendly and URLs of resources that have been identified as not being family friendly. In each of these embodiments, training items are readily available in a search log of a search engine, where a relatively large number of training items (e.g., on the order of millions or billions of training items) can be used to train the classifier module 134.

The technologies described above exhibit various advantages over conventional approaches for determining whether or not a resource is spam. Due to the relatively large amount of training data, the computing system 106 is able to fairly accurately predict whether or not a resource pointed to by a URL is spam based solely upon the URL; that is, the classifier module 134 is able to discern patterns in URLs that are not readily discernable by humans, and employ those patterns to predict whether or not URLs are spam. In addition, the classifier module 134 can be readily updated as new URLs are identified (as spammers are constantly creating new spam resources). Moreover, computing resources are saved, as the crawler module 138 need not crawl resources that are identified by the classifier module 134 as having a high probability of being spam.

Figure 2:
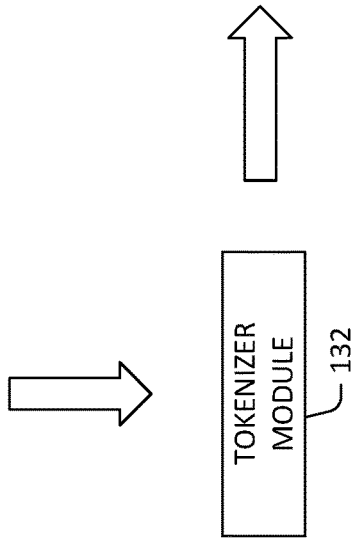
FIG. 2 depicts a transformation of a uniform resource locator (URL) into a sequence of identifiers.

With reference now to FIG. 2, a diagram that depicts operation of the tokenizer module 132 is presented. In an example, the Pth URL 130 is http://www.example.com/prdcttype/newitm/product.html. Continuing with this example, the tokenizer module 132 breaks the URL into a sequence of 11 separate tokens: "http://www.", "example", ".com/", "prdct", "type", "/", "new", "itm", "/", "product", and ".html". As indicated previously, each of these 11 tokens may be one of a predefined number (e.g., 150,000, 250,000, 500,000, etc.) of tokens that the tokenizer module 132 is configured to identify. The tokenizer module 132 maps the tokens extracted from the Pth URL 130 to respective token identifiers for the tokens. In the example depicted in FIG. 2, the tokenizer module 132 maps the eleven tokens into the sequence of token identifiers "5", "25", "676", "2567", "10876", "356", "12567", "165789", "356", "25674", and "213584".

In addition, in the example depicted in FIG. 2, the tokenizer module 132 forms bigrams from the tokens (or from the token identifiers), where the bigrams are "http://www.example", "example.com/", ".com/prdct", "prdcttype", "type/", "/new", "newitm", "itm/", "/product", "product.html", and ".html-null". The tokenizer module 132 then transforms the bigrams into respective bigram identifiers. In an example, the tokenizer module 132 hashes each bigram into one of a predefined number (e.g., 180 million) of bins, where each bin corresponds to a bigram identifier. In FIG. 2, the bigram "http://www.example" is transformed into the bigram identifier 250623, the bigram "example.com" is transformed into the bigram identifier 1345832, and so forth. The output of the tokenizer module 132 is thus a sequence of LDs that includes the sequence of token identifiers and the sequence of bigram identifiers. The Pth URL 130 is therefore represented by the sequence of IDs.

Referring now to FIG. 3, operation of the classifier module 134 is illustrated. The classifier module 134 receives the sequence of LDs output by the tokenizer module 132, where the sequence of IDs includes the token identifiers and the bigram identifiers. The sequence of IDs for the Pth URL 130 is provided as input to the classifier module 134, and the classifier module 134 outputs a score for the Pth URL 130 (and thus for the first Pth resource), where the score is indicative of a likelihood that the Pth resource is spam.

Other embodiments pertaining to the tokenizer module 132 and the classifier module 134 are now set forth. A URL may include several elements that are consistent across URLs. For instance, a URL may include the following portions: 1) a scheme; 2) a host name; 3) a path; and 4) a query string. The scheme identifies the protocol to be used to access the resource on the Internet (e.g., HTTP or HTTPS). The host name identifies the host that holds the resource; for example, www.example.com. A host name can sometimes be followed by a port number. The path identifies the specific resource in the host that a web client wants to access—for example: /software/hto/cics/index.html. The query string, when included in a URL, follows the path and provides a string of information that the resource can use for some purpose (for example, as parameters for a search or as data to be processed). The query string is typically a string of name and value pairs; for example, term=bluebird. Name and value pairs are separated from each other by an ampersand (&); for example, term=bluebird&source=browser-search.

In an example embodiment, the tokenizer module 132 can parse a URL and identify one or more of these components of the URL, so that certain components of the URL can be masked, certain components can be extracted from the URL and tokenized separately, etc. This can be undertaken to avoid overfitting of the classifier module 134. In an example, the classifier module 134 can include several separate classifier modules, with each classifier module being a binary classifier that is configured to compute a probability that a resource pointed to by a URL is spam based upon a portion of the URL or a combination of portions of the URL. For instance, the classifier module 134 can include a first classifier module that is configured to receive a sequence of IDs that represents an entirety of a URL, a second classifier module that is configured to receive a sequence of IDs that represents a host of the URL, a third classifier module that is configured to receive a sequence of IDs that represent a query string of the URL, etc. Each classifier module in the classifier modules is configured to compute a score that is indicative of a probability that the resource pointed to by the URL is spam based upon the sequence of IDs respectively received by the classifier module. Continuing with the example set forth above, the first classifier module receives a first sequence of IDs that represents the entirety of the URL; the second classifier module receives a second sequence of IDs that represents the host name in the URL (but not other portions of the URL), and the third classifier module receives a third sequence of IDs that represents the query string of the URL.

The first classifier module outputs a first score based upon the first sequence of IDs, the second classifier module outputs a second score based upon the second sequence of IDs, and the third classifier module outputs a third score based upon the third sequence of IDs, wherein the first, second, and third scores are computed probabilities that the resource pointed to by the URL is spam. The classifier module 134 can act as a voting system, taking into account the three different scores when outputting a probability that the resource pointed to by the URL is spam. Thus, a score output by the classifier module 134 is based upon multiple scores output by multiple classifiers.

Further, constraints can be learned based upon scores output by the multiple classifiers. Pursuant to an example, a spammer may create a URL for a spam resource and may create a particular query string in the URL for the purpose of preventing the classifier module 134 (or other computer-implemented tool for detecting spam resources) from labeling the resource as spam. The first classifier (based upon a sequence of IDs that represents the entirety of the URL) may output a score that indicates that the resource is more likely than not to be spam, but with a value that indicates a reasonably high probability that the resource is not spam (e.g., a 60% likelihood that the resource is spam). The second classifier (based upon a sequence of IDs that represents the host name in the URL) may output a second score that indicates that there is a very high probability that the resource is spam (e.g., over a 95% likelihood that the resource is spam). A constraint can be learned over time based upon scores output by the classifiers, such that when the first score is above a first threshold and the second score is above a second threshold, the URL is to be assigned a label that indicates that the resource is spam.

In such an embodiment, the classifiers are trained using appropriate positive and negative examples; for instance, the first classifier is trained with positive and negative examples with the entireties of the URL represented; the second classifier is trained with positive and negative examples with only the host names of the URLs represented, etc.

In another embodiment, the classifier module 134 can be trained with positive and negative examples for different portions of URLs. For instance, there may be positive training examples in the training data where the host name is masked; there may be positive training examples in the training data where the query string is masked; there may be negative training examples in the training data where the host name is masked, etc. This approach can prevent the classifier module 134 from being overfitted with respect to certain portions of URLs. When a prediction about a resource is desired, the classifier module 134 can be provided with multiple different sequences of IDs that correspond to the URL: 1) a first sequence of IDs that represent the entirety of the URL; 2) a second sequence of IDs that represents only the host name in the URL (with the query path, sub-domains, etc. masked); 3) a third sequence of IDs that represents only the query path, etc. The classifier module 134 can compute a score for each different sequence of IDs, and the classifier module 134 can output a final score for the resource based upon the multiple scores computed for the multiple different sequences of IDs.

Figure 4:
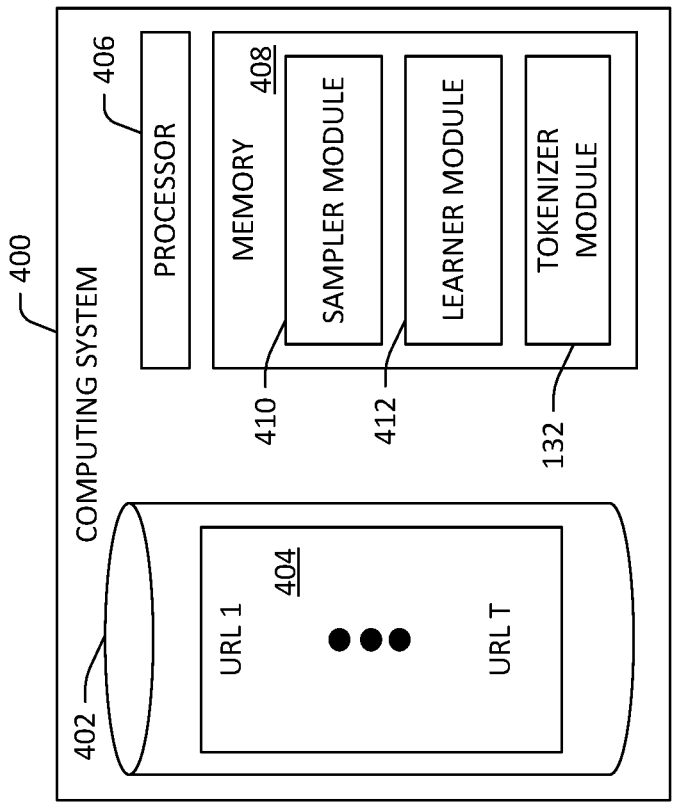
FIG. 4 is a functional block diagram of a computing system that is configured to learn a tokenizer module that is adapted to tokenize URLs.

With reference now to FIG. 4, a functional block diagram of a computing system 400 that is configured to learn the tokenizer module 132 is illustrated. The computing system 400 has a computer-readable data store 402 that includes a list of URLs 404. The list of URLs 404 can include URLs for webpages of which the search engine is aware. Thus, the URLs in the list of URLs 404 can include URLs that have a corresponding entry in the search engine index 124 as well as URLs for webpages of which the search engine is aware but have been identified as spam and thus do not have a corresponding entry in the search engine index 124. The computing system 400 also includes a processor 406 and memory 408 that stores data that is accessed by the processor 406 and instructions that are executed by the processor 406. The memory 408 has a sampler module 410 loaded therein that selects several URLs from the listing of URLs 404 in the computer-readable data store 402. For instance, the sampler module 410 randomly samples URLs from the list of URLs 404, and therefore the URLs selected by the sampler module 410 may include URLs that have corresponding entries in the search engine index 124, URLs of webpages that have been labeled as being spam, URLs for popular webpages, URLs for unpopular webpages, etc. In another example, the sampler module 410 uses a weighted approach when sampling from the list of URLs 404, such that the sampler module 410 is more likely to select URLs of webpages that have been identified as spam than URLs of webpages that have been determined to not be spam.

The memory 406 also includes a learner module 412 that learns identities of tokens in the URLs sampled from the list of URLs 404 by the sampler module 410, and thus learns the tokenizer module 132. The learner module 412 can learn the tokenizer module 132 based upon a statistical analysis of alphanumerical sequences in the sampled URLs, such that alphanumerical sequences that occur frequently in the sampled URLs are identified as tokens. The learner module 412 is configured to identify a predefined number of tokens in the URLs. As noted previously, in an example, the learner module 412 is configured to identify 250,000 tokens, such that the vocabulary of the tokenizer module 132 is 250,000.

Figure 5:
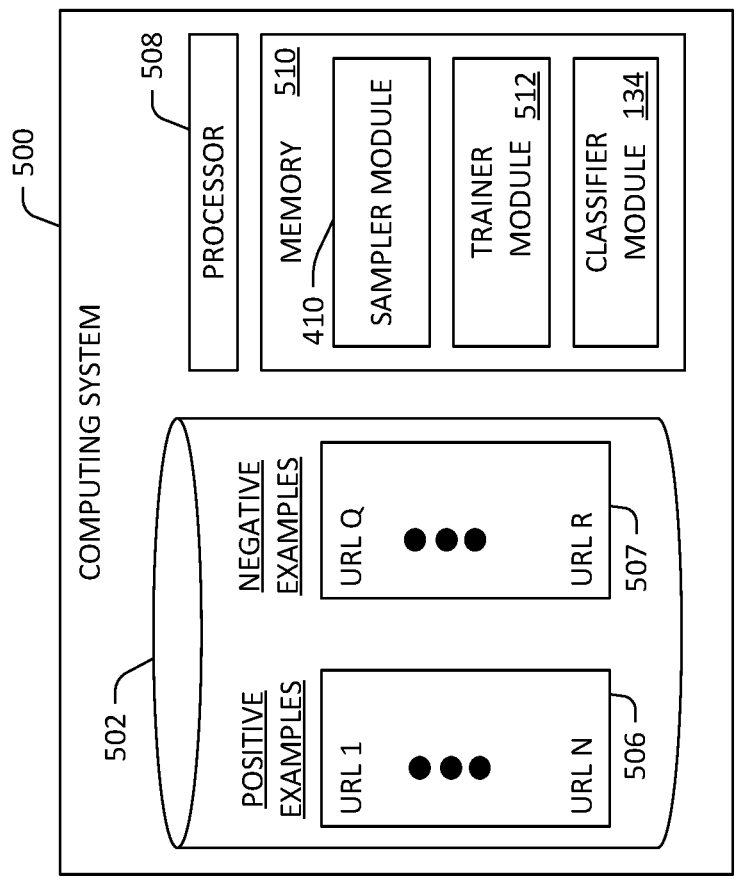
FIG. 5 is a functional block diagram of a computing system that is configured to learn a classifier module that is adapted to compute a score for a resource based upon a URL of the resource.

Now referring to FIG. 5, a functional block diagram of a computing system 500 that is configured to train the classifier module 134 is illustrated. While the system 500 is illustrated as being separate from the system 400, it is to be understood that the system 400 can be configured to train the classifier module 134. The computing system 500 includes a computer-readable data store 502, where the data store 502 stores a database 506 of positive examples (URLs of resources that have been identified a spam) and a database 507 of negative examples (URLs of resources that are not spam). Further, in the databases 506 and 507, there may be some time constraint on the examples (e.g., in the database 506, the URLs may point to resources that have existed for a relatively small amount of time, such as two months).

The computing system 500 includes a processor 508 and memory 510 that includes data that is accessed by the processor 508 and instructions that are executed by the processor 508. The memory 510 includes the sampler module 410 that samples URLs from the databases 506 and 507. In an embodiment, the sampler module 410 samples from the databases 506 and 507 such that a ratio between positive and negative training examples is at some desired amount (e.g., 20% positive training examples and 80% negative training examples). Pursuant to an example, the sampler module 410 samples hundreds of millions to billions of training items (e.g., URLs and indications as to whether resources corresponding to the URLs are spam.

The memory 510 further includes a trainer module 512 that trains the classifier module 134 based upon the training items sampled from the databases 506 and 507 by the sampler module 410. With more specificity, each of the URLs sampled from the databases 506 and 507 by the sampler module 410 is tokenized by the tokenizer module 132, such that the tokenizer module 132 outputs a sequence of IDs for each URL. The trainer module 512 receives, for each sampled URL, the sequence of IDs that represents the URL and a label indicating whether or not a resource pointed to by the URL is spam.

The trainer module 512 uses any suitable supervised learning approach in connection with training the classifier module 134, which in this example acts as a computer-implemented binary classifier. For instance, the trainer module 512 employs backpropagation when training the classifier module 134.

Pursuant to an example, the classifier module 134 is trained periodically (e.g., every three days), and is trained based upon data in the databases 506 and 507 that is fairly recent (e.g., within the last two months). This allows the classifier module 134 to adapt to changes in behavior of spammers. As noted above, spammers tend to change tactics in order to cause a search engine to index a spam resource, so that the search engine returns the spam resource to a querier. By retraining the classifier module 134 periodically and based upon recent data, the scores output by the classifier module 134 are reflective of recent behavior of spammers.

Figure 6:
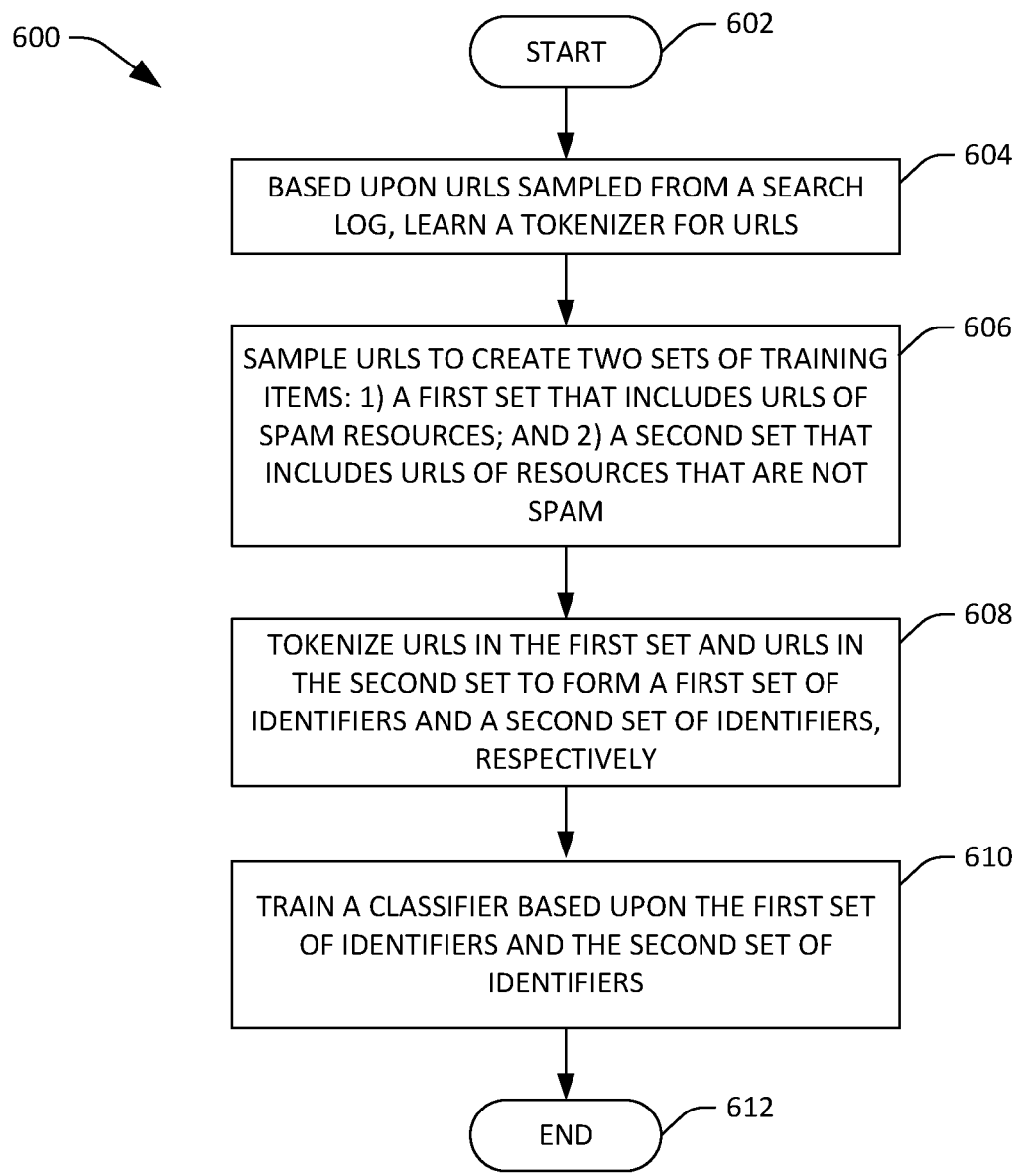
FIG. 6 illustrates a methodology for training a classifier, where the classifier, when trained, is configured to output a score for a resource based upon a URL of the resource.
Figure 7:
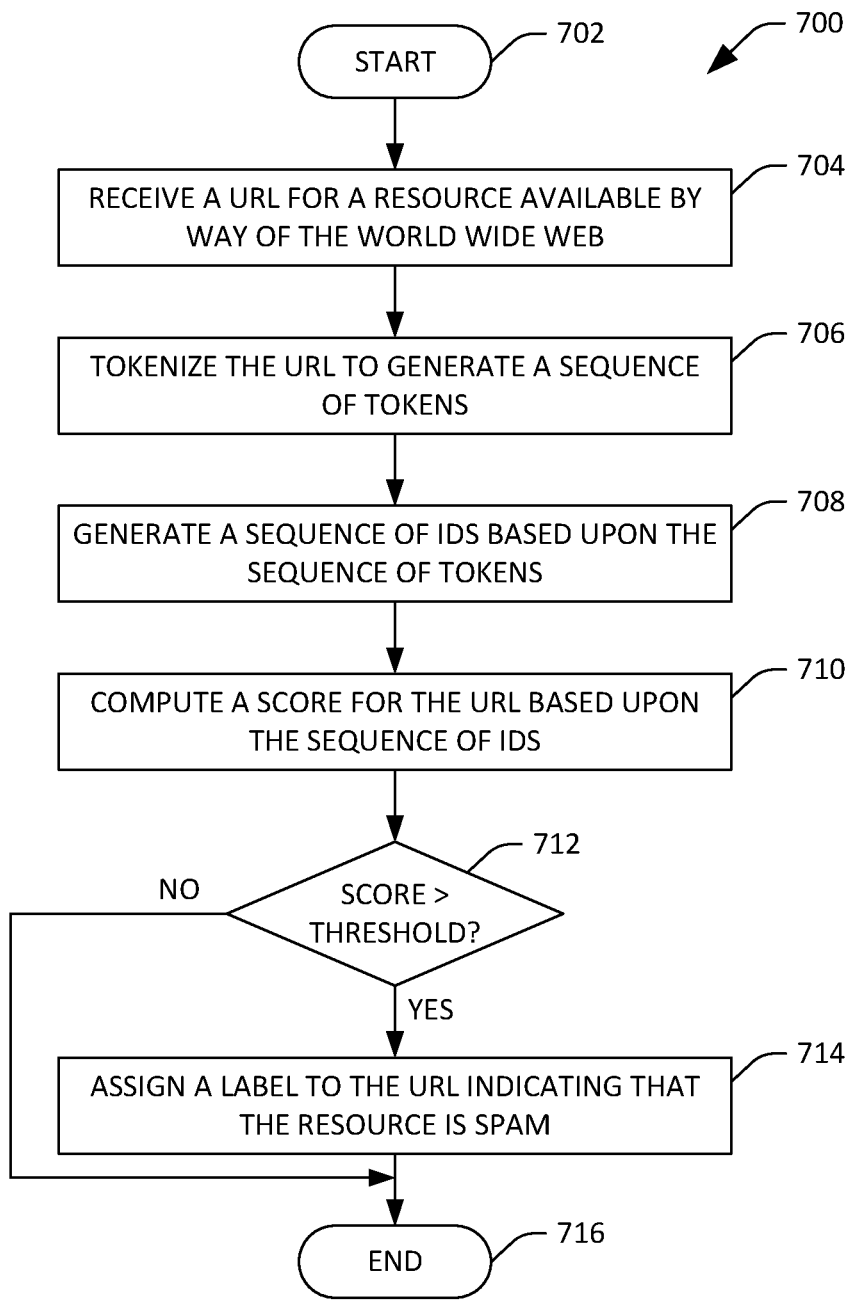
FIG. 7 illustrates a methodology for updating a search engine index based upon a score computed for a resource, where the score is computed based upon a URL of the resource.

FIGS. 6 and 7 illustrate methodologies relating to determining whether a resource is spam based solely upon a URL for the resource. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 6, a flow diagram illustrating a methodology for training the classifier module 134 is illustrated. The methodology 600 starts at 602, and at 604, based upon URLs sampled from a search log of a search engine, a tokenizer designed to tokenize URLs is learned. At 606, URLs are sampled to create two sets of training items: 1) a first set of training items that includes URLs of spam resources; and 2) a second set of training items that includes URLs of resources that are not spam.

At 608, the tokenizer learned at 604 is employed to tokenize URLs in the first set of training items and URLs in the second set of training items in connection with forming a first set of identifiers and a second set of identifiers that represent the URLs in the first set of training items and the URLs in the second set of training items, respectively.

At 610, the classifier module 134 is trained based upon the first set of identifiers and the second set of identifiers. The methodology 600 completes at 612.

Now referring to FIG. 7, a flow diagram illustrating a methodology 700 for determining whether or not a resource is spam is depicted. The methodology 700 starts at 702, and at 704 a URL is received for a resource. In an example, there is no entry for the resource in a search engine index of a search engine. At 706, the URL is tokenized to generate a sequence of tokens. At 708, a sequence of IDs is generated based upon the sequence of tokens, wherein the sequence of IDs includes a sequence of token identifiers and a sequence of n-gram identifiers. At 710, a score for the URL is computed based upon the sequence of IDs generated at 708. At 712, a determination is made as to whether the score is greater than a threshold. When the score is greater than the threshold, at 714 a label is assigned to the URL, where the label indicates that the resource pointed to by the URL is spam. If the score is less than the threshold, then the resource can be retrieved and further analyzed to ascertain whether or not the resource is spam. When it is determined that the resource is not spam, a search engine index is updated to include an entry for the resource. For instance, a crawler retrieves the resource, extracts information from the resource, and updates the search engine index based upon the information extracted from the resource. The methodology 700 ends at 714 when it is determined at 712 that the score is not greater than the threshold or subsequent to the label being assigned to the resource.

The features described herein relate to whether or not a resource (e.g., a webpage) is spam according to at least the examples provided below.

(A1) In one aspect, some embodiments include a method for identifying that a resource pointed to by a URL is spam, the method performed by a computer processor, the method including obtaining the URL that points to the resource, wherein the URL includes a sequence of characters. The method additionally includes generating a sequence of numbers based upon the sequence of characters, wherein the sequence of numbers represents at least a portion of the URL. The method also includes generating a score for the URL based upon the sequence of numbers, wherein the score is indicative of a probability that the resource pointed to by the URL is spam. The method additionally includes comparing the score with a predefined threshold. The method also includes when the score is above the predefined threshold, assigning a label to the URL that indicates that the resource pointed to by the URL is spam, wherein an entry for the resource is not included in a search engine index based upon the label assigned to the URL.

(A2) In some embodiments of the method of A1, the method also includes: a) when the score is below the predefined threshold, retrieving the resource pointed to by the URL; b) upon retrieving the resource, extracting content from the resource; and c) updating the search engine index to include the entry for the resource based upon the content extracted from the resource.

(A3) In some embodiments of any of the methods of A1-A2, the resource is a webpage.

(A4) In some embodiments of any of the methods of A1-A3, generating the score for the URL includes providing the sequence of numbers to a binary classifier, wherein the binary classifier has been trained based upon training pairs. In addition, each training pair includes: a) a respective sequence of numbers that represents a respective URL; and b) a respective label assigned to the respective sequence of numbers, wherein the respective label identifies whether or not the respective URL points to a respective spam resource.

(A5) In some embodiments of any of the methods of A1-A4, the sequence of numbers represents a first portion of the URL, and the URL includes a second sequence of characters. The method also includes generating a second sequence of numbers based upon the second sequence of characters, wherein the second sequence of numbers represents a second portion of the URL. The method additionally includes providing the sequence of numbers to a first binary classifier, wherein the first binary classifier outputs a first score based upon the sequence of numbers, wherein the first score is a first computed probability that the resource pointed to by the URL is spam. The method also includes providing the second sequence of numbers to a second binary classifier, wherein the second binary classifier outputs a second score based upon the second sequence of numbers, wherein the second score is a second computed probability that the resource pointed to by the URL is spam, wherein the score is based upon the first score and the second score.

(A6) In some embodiments of any of the methods of A1, A2, A4, or A5, the resource is an image or video.

(A7) In some embodiments of any of the methods of A1-A6, generating the sequence of numbers based upon the sequence of characters includes tokenizing the URL to generate a sequence of numerical identifiers, wherein the sequence of numbers is based upon the sequence of numerical identifiers.

(A8) In some embodiments of any of the methods of A1-A4, A6, or A7, the sequence of numbers represents a first portion of the URL, and the URL includes a second sequence of characters. The method also includes generating a second sequence of numbers based upon the second sequence of characters, wherein the second sequence of numbers represents a second portion of the URL. The method further includes providing the sequence of numbers to a binary classifier, wherein the binary classifier outputs a first score based upon the sequence of numbers, wherein the first score is a first computed probability that the resource pointed to by the URL is spam. The method additionally includes providing the second sequence of numbers to the binary classifier, wherein the binary classifier outputs a second score based upon the second sequence of numbers, wherein the second score is a second computed probability that the resource pointed to by the URL is spam, and further wherein the score for the URL is based upon the first score and the second score.

(A9) In some embodiments of the method of A8, the first portion of the URL is a domain, and the second portion of the URL is a path.

(B1) In another aspect, some embodiments include a method performed by at least one processor of a computing system. The method includes obtaining a uniform resource locator (URL) that points to a resource that is available by way of the World Wide Web. The method also includes tokenizing the URL to generate a vector of numbers, wherein the vector of numbers represents at least a portion of the URL. The method additionally includes providing the vector of numbers to a binary classifier, wherein the binary classifier, based upon the vector of numbers, outputs a computed probability that the resource is spam. The method further includes comparing the computed probability with a threshold and based upon the computed probability being above the threshold, assigning a label to the URL that indicates that the resource is spam, wherein the label is assigned without retrieving the resource.

(B2) In some embodiments of the method of B1, the resource is a webpage.

(B3) In some embodiments of any of the methods of B1-B2, the binary classifier is trained based upon a first set of training items and a second set of training items, the first set of training items including first URLs that have been identified as pointing to spam resources, the second set of training items including second URLs that have identified as pointing to resources that are not spam.

(B4) In some embodiments of the method of B3, the second set of training items are retrieved from a search engine index.

(B5) In some embodiments of any of the methods of B1-B4, the method further includes obtaining a second URL that points to a second resource that is available by way of the World Wide Web. The method also includes tokenizing the second URL to generate a second vector of numbers, wherein the second vector of numbers represents at least a portion of the second URL. The method additionally includes providing the second vector of numbers to the binary classifier, wherein the binary classifier, based upon the second vector of numbers, outputs a second computed probability that the second resource is spam. The method further includes comparing the second computed probability with the threshold. The method also includes based upon the second computed probability being below the threshold, retrieving the second resource. The method additionally includes extracting content from the second resource.

(B6) In some embodiments of the method of B5, the method also includes updating a search engine index to include an entry for the second resource based upon the content extracted from the second resource. The method additionally includes subsequent to updating the search engine index, receiving a query from a client computing device. The method further includes identifying the entry in the search engine index based upon the query. The method also includes returning a search result that represents the second resource to the client computing device.

(B7) In some embodiments of the method of B5, the method also includes assigning a second label to the second URL based upon the content extracted from the second resource, wherein the second label indicates that the second resource is spam.

(C1) In another aspect, some embodiments include a method performed by a computer processor, the method includes obtaining a URL that points to a resource that is available by way of the Internet, wherein the URL includes a sequence of characters. The method also includes generating a sequence of numerical identifiers based upon the sequence of characters, wherein the sequence of numerical identifiers represents at least a portion of the URL. The method additionally includes computing a score for the URL based upon the sequence of numerical identifiers, wherein the score is indicative of a probability that the resource pointed to by the URL is spam. The method further includes comparing the score with a predefined threshold. The method also includes when the score is above the predefined threshold, assigning a label to the URL that indicates that the resource pointed to by the URL is spam, wherein an entry for the resource is not included in a search engine index based upon the label assigned to the URL.

(C2) In some embodiments of the method of C1, the method further includes: a) when the score is below the predefined threshold, retrieving the resource pointed to by the URL; b) upon retrieving the resource, extracting content from the resource; and updating the search engine index to include the entry for the resource based upon the content extracted from the resource.

(C3) In some embodiments of any of the methods of C1-C2, the resource is a webpage.

(C4) In some embodiments of any of the methods of C1-C3, generating the score for the URL includes providing the sequence of numerical identifiers to a binary classifier, wherein the binary classifier has been trained based upon training pairs. Further, each training pair comprises: a) a respective sequence of numerical identifiers that represents a respective URL; and b) a respective label assigned to the respective sequence of numerical identifiers, wherein the respective label identifies whether or not the respective URL points to a respective spam resource.

(D1) In still yet another aspect, a computing system is described herein, where the computing system includes a processor and memory that stores instructions that, when executed by the processor, cause the processor to perform any of the methods described herein (e.g., any of A1-A9, B1-B7, or C1-C4).

(E1) In yet another aspect, a computer-readable storage medium is described herein, where the computer-readable storage medium includes instructions that, when executed by a processor, cause the processor to perform any of the methods described herein (e.g., any of A1-A9, B1-B7, or C1-C4).

Figure 8:
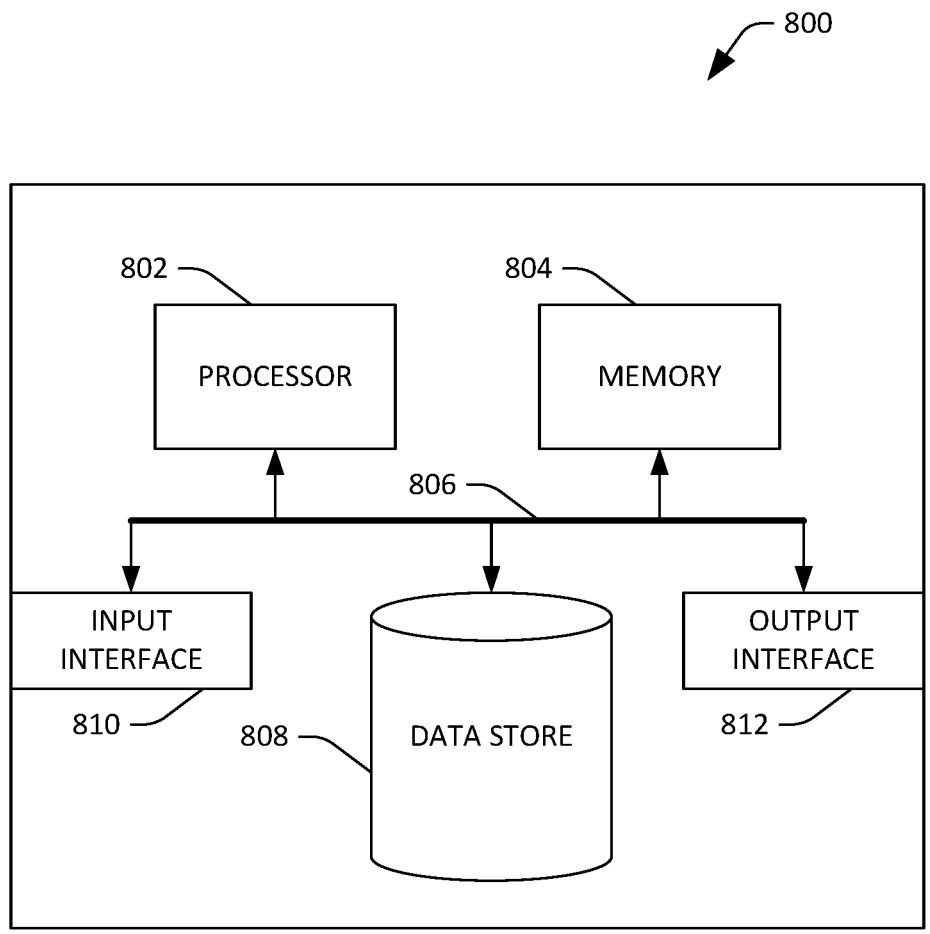
FIG. 8 is an example computing system.

Referring now to FIG. 8, a high-level illustration of an example computing device 800 that can be used in accordance with the systems and methodologies disclosed herein is illustrated. For instance, the computing device 800 may be used in a system that determines that a resource is spam based upon a URL of the resource. By way of another example, the computing device 800 can be used in a system that trains a classifier module to output scores that are indicative of whether or not a resource is spam. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store URLs, tokens of URLs, etc.

The computing device 800 additionally includes a data store 808 that is accessible by the processor 802 by way of the system bus 806. The data store 808 may include executable instructions, a search engine log, tokens, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can be or include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to identify that a webpage pointed to by a Uniform Resource Locator (URL) includes spam, the computing system comprising:
   a processor; and
   memory storing instructions that, when executed by the processor, cause the processor to perform acts comprising:
      obtaining the URL that points to the webpage, wherein the URL includes a sequence of characters;
      generating a sequence of numbers based upon the sequence of characters, wherein the sequence of numbers represents at least a portion of the URL;
      generating, by a computer-implemented machine learning model, a score for the URL based upon the sequence of numbers, wherein the score is indicative of a probability that the webpage pointed to by the URL includes spam;
      comparing the score with a predefined threshold; and
      when the score is above the predefined threshold, assigning a label to the URL that indicates that the webpage pointed to by the URL includes spam, wherein an entry for the webpage is not included in a search engine index based upon the label assigned to the URL.

2. The computing system of claim 1, the acts further comprising:
   when the score is below the predefined threshold, retrieving the webpage pointed to by the URL;
   upon retrieving the webpage, extracting content from the webpage; and
   updating the search engine index to include the entry for the webpage based upon the content extracted from the webpage.

3. The computing system of claim 1, wherein generating the score for the URL comprises:
   providing the sequence of numbers to a binary classifier, wherein the binary classifier has been trained based upon training pairs, and further wherein each training pair comprises:
      a respective sequence of numbers that represents a respective URL; and
      a respective label assigned to the respective sequence of numbers, wherein the respective label identifies whether or not the respective URL points to a respective webpage that includes spam.

4. The computing system of claim 1, wherein the sequence of numbers represents a first portion of the URL, and further wherein the URL includes a second sequence of characters, the acts further comprising:
   generating a second sequence of numbers based upon the second sequence of characters, wherein the second sequence of numbers represents a second portion of the URL;
   providing the sequence of numbers to a first binary classifier, wherein the first binary classifier outputs a first score based upon the sequence of numbers, wherein the first score is a first computed probability that the webpage pointed to by the URL includes spam; and
   providing the second sequence of numbers to a second binary classifier, wherein the second binary classifier outputs a second score based upon the second sequence of numbers, wherein the second score is a second computed probability that the webpage pointed to by the URL includes spam, wherein the score is based upon the first score and the second score.

5. The computing system of claim 1, wherein the webpage includes an image or video.

6. The computing system of claim 1, wherein generating the sequence of numbers based upon the sequence of characters comprises tokenizing the URL to generate a sequence of numerical identifiers, wherein the sequence of numbers is based upon the sequence of numerical identifiers.

7. The computing system of claim 1, wherein the sequence of numbers represents a first portion of the URL, and further wherein the URL includes a second sequence of characters, the acts further comprising:
   generating a second sequence of numbers based upon the second sequence of characters, wherein the second sequence of numbers represents a second portion of the URL;

providing the sequence of numbers to a binary classifier, wherein the binary classifier outputs a first score based upon the sequence of numbers, wherein the first score is a first computed probability that the webpage pointed to by the URL includes spam; and providing the second sequence of numbers to the binary classifier, wherein the binary classifier outputs a second score based upon the second sequence of numbers, wherein the second score is a second computed probability that the resource pointed to by the URL includes spam, and further wherein the score for the URL is based upon the first score and the second score.

8. The computing system of claim 7, wherein the first portion of the URL is a domain, and the second portion of the URL is a path.

9. A method performed by at least one processor of a computing system, the method comprising:
obtaining a uniform resource locator (URL) that points to a webpage that is available by way of the World Wide Web;
tokenizing the URL to generate a vector of numbers, wherein the vector of numbers represents at least a portion of the URL;
providing the vector of numbers to a computer-implemented binary classifier, wherein the computer-implemented binary classifier, based upon the vector of numbers, outputs a computed probability that the webpage includes spam;
comparing the computed probability with a threshold; and
based upon the computed probability being above the threshold, assigning a label to the URL that indicates that the webpage includes spam, wherein the label is assigned without retrieving the webpage.

10. The method of claim 9, wherein the binary classifier is trained based upon a first set of training items and a second set of training items, the first set of training items including first URLs that have been identified as pointing to webpages that include spam, the second set of training items including second URLs that have identified as pointing to webpages that do not include spam.

11. The method of claim 10, wherein the second set of training items are retrieved from a search engine index.

12. The method of claim 9, further comprising:
obtaining a second URL that points to a second webpage that is available by way of the World Wide Web;
tokenizing the second URL to generate a second vector of numbers, wherein the second vector of numbers represents at least a portion of the second URL;
providing the second vector of numbers to the binary classifier, wherein the binary classifier, based upon the second vector of numbers, outputs a second computed probability that the second webpage includes spam;
comparing the second computed probability with the threshold;
based upon the second computed probability being below the threshold, retrieving the second webpage; and
extracting content from the second webpage.

13. The method of claim 12, further comprising:
updating a search engine index to include an entry for the second webpage based upon the content extracted from the second webpage;
subsequent to updating the search engine index, receiving a query from a client computing device;
identifying the entry in the search engine index based upon the query; and
returning a search result that represents the second webpage to the client computing device.

14. The method of claim 12, further comprising:
assigning a second label to the second URL based upon the content extracted from the second webpage, wherein the second label indicates that the second webpage includes spam.

15. A computer-readable storage medium comprising instructions that, when executed by a processor, cause the processor to perform acts comprising:
obtaining a URL that points to a webpage that is available by way of the Internet, wherein the URL includes a sequence of characters;
generating a sequence of numerical identifiers based upon the sequence of characters, wherein the sequence of numerical identifiers represents at least a portion of the URL;
computing, by a computer-implemented machine learning model, a score for the URL based upon the sequence of numerical identifiers, wherein the score is indicative of a probability that the webpage pointed to by the URL includes spam;
comparing the score with a predefined threshold; and
when the score is above the predefined threshold, assigning a label to the URL that indicates that the webpage pointed to by the URL includes spam, wherein an entry for the webpage is not included in a search engine index based upon the label assigned to the URL.

16. The computer-readable storage medium of claim 15, the acts further comprising:
when the score is below the predefined threshold, retrieving the webpage pointed to by the URL;
upon retrieving the webpage, extracting content from the webpage; and
updating the search engine index to include the entry for the webpage based upon the content extracted from the webpage.

17. The computer-readable storage medium of claim 15, wherein generating the score for the URL comprises:
providing the sequence of numerical identifiers to a binary classifier, wherein the binary classifier has been trained based upon training pairs, and further wherein each training pair comprises:
a respective sequence of numerical identifiers that represents a respective URL; and
a respective label assigned to the respective sequence of numerical identifiers, wherein the respective label identifies whether or not the respective URL points to a webpage that includes spam.

18. The computer-readable storage medium of claim 15, wherein the webpage includes an image or video.

19. The computer-readable storage medium of claim 15, wherein generating the sequence of numbers based upon the sequence of characters comprises tokenizing the URL to generate a sequence of numerical identifiers, wherein the sequence of numbers is based upon the sequence of numerical identifiers.

20. The computer-readable storage medium of claim 15, wherein the sequence of numbers represents a first portion of the URL, and further wherein the URL includes a second sequence of characters, the acts further comprising:
generating a second sequence of numbers based upon the second sequence of characters, wherein the second sequence of numbers represents a second portion of the URL;
providing the sequence of numbers to a first binary classifier, wherein the first binary classifier outputs a first score based upon the sequence of numbers, wherein the first score is a first computed probability that the webpage pointed to by the URL includes spam; and providing the second sequence of numbers to a second binary classifier, wherein the second binary classifier outputs a second score based upon the second sequence of numbers, wherein the second score is a second computed probability that the webpage pointed to by the URL includes spam, wherein the score is based upon the first score and the second score.

\* \* \* \* \*